A. CHURCHWARD.
RECTIFIER SYSTEM.
APPLICATION FILED OCT. 14, 1907.

996,975.

Patented July 4, 1911.

Witnesses:
George H. Tilden
J. Ellis Glen

Inventor:
Alexander Churchward,
by Albert G. Davis
Att'y.

UNITED STATES PATENT OFFICE.

ALEXANDER CHURCHWARD, OF NEW YORK, N. Y., ASSIGNOR TO GENERAL ELECTRIC COMPANY, A CORPORATION OF NEW YORK.

RECTIFIER SYSTEM.

996,975.  Specification of Letters Patent.  Patented July 4, 1911.

Application filed October 14, 1907. Serial No. 397,269.

*To all whom it may concern:*

Be it known that I, ALEXANDER CHURCHWARD, a citizen of the United States, residing at New York, county of New York, State of New York, have invented certain new and useful Improvements in Rectifier Systems, of which the following is a specification.

In the operation of rectifiers of that type commonly known in the art as mercury arc rectifiers, it is necessary that the load current, or in other words the rectified current supplied by the rectifier, shall at all times equal or exceed a certain minimum value, as otherwise the rectifying arcs become unstable and go out and then require restarting.

It is one of the objects of my present invention to provide means whereby if the load current on the rectifier becomes too small consistent with stable operation, the rectifier will be prevented from going out.

The novel features of my invention I have pointed out with particularity in the appended claims. The invention itself, however, will be better understood by reference to the following description taken in connection with the accompanying drawings, in which—

Figure 1:
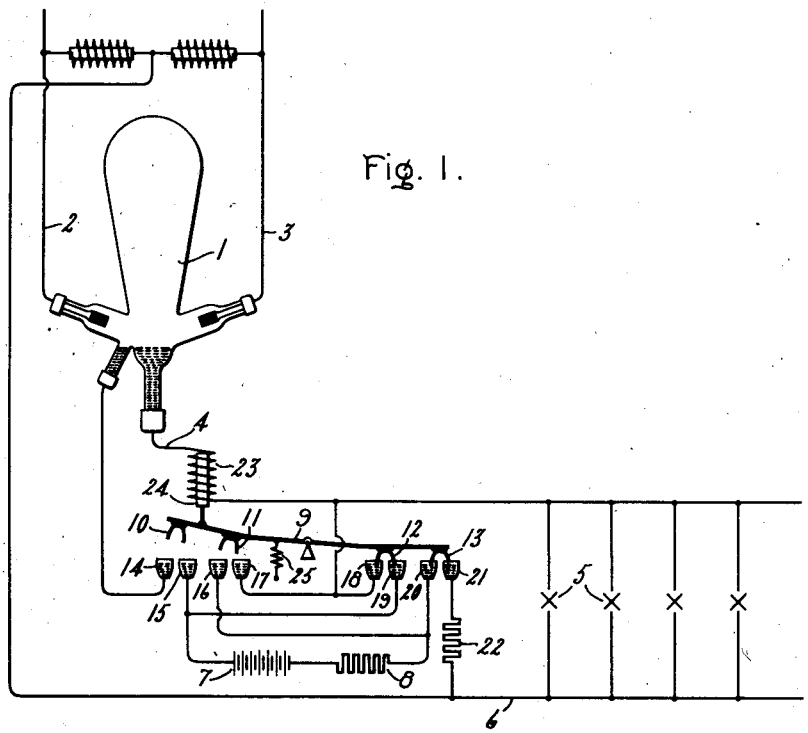
Figure 2:
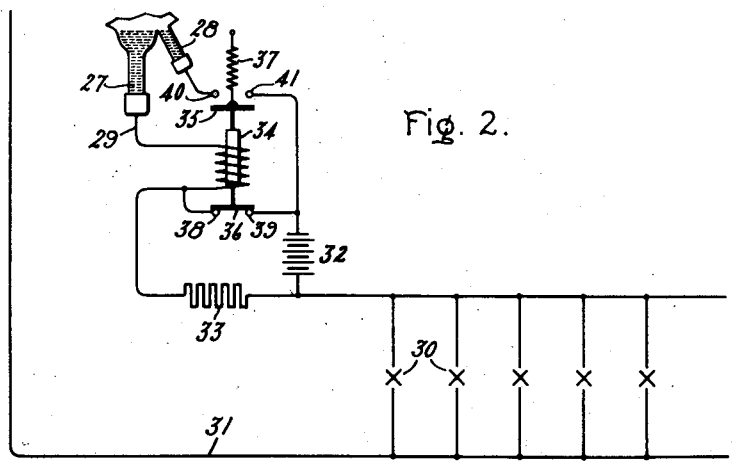

Figure 1 represents one embodiment of my invention; and Fig. 2 a modification.

In order to prevent the rectifier from going out when the load current reaches or approaches the region of instability, I arrange means for producing in the rectifier an auxiliary arc fed from a suitable source of direct current, in this case a small storage battery. When this auxiliary arc is not needed, the storage battery is automatically connected so as to charge from the rectifier circuit. When the load current approaches the danger limit, at which the rectifier will go out, the storage battery is automatically switched over so as to start and maintain an auxiliary arc in the rectifier.

In the arrangement shown in Fig. 1, the storage battery used to produce the auxiliary arc in the rectifier is arranged to be connected in multiple with the load on the rectifier when the services of the battery for maintaining the auxiliary arc are not needed. In this figure the rectifier envelop or container is indicated conventionally at 1 and is provided with the usual supply mains 2 and 3 leading to the anodes of the rectifier. From the cathode or negative electrode of the rectifier there extends a lead 4 which serves to convey current to the load indicated conventionally at 5. The return conductor for the load current is shown at 6.

The storage battery which I use for producing the auxiliary arc in the rectifier is indicated at 7 and may have a suitable resistance 8 in series therewith. In order to make the desired changes in connections for this battery, any suitable form of switch may be employed. In the drawings, one form of switch suitable for the purpose is illustrated conventionally. The same consists of a pivoted arm or beam 9 carrying circuit-closing contacts coöperating with suitable mercury cups. All of these circuit-closing contacts, namely, those numbered 10, 11, 12 and 13, are insulated respectively from the pivoted arm or member 9. The mercury cups 14, 15 are connected respectively to the auxiliary anode of the rectifier and the positive terminal of battery 7. The mercury cups 16, 17 are connected respectively to the negative terminal of the battery circuit and the lead 4 going to the work circuit. The mercury cups 18, 19 are connected respectively to the lead 4 and the positive terminal of the battery 7. The remaining set of mercury cups 20 and 21 are connected respectively to the negative terminal of the battery circuit and the main or return conductor 6. In the connection between the mercury cup 21 and the main 6 an additional resistance 22 may be provided if desired, so that the battery when connected for charging may charge at as slow a rate as desired, and slower than the rate of discharge permitted by resistance 8 which limits the current in the auxiliary arc when the battery is connected to produce this arc.

A solenoid 23 traversed by current in the lead 4 operates through a core 24 to urge upward the left-hand portion of the lever 9, while a spring 25 tends to hold down this end of the lever. The parts are adjusted so that when the current in the main decreases below a certain amount, say, for example, 3 or 4 amperes, the spring 25 will overcome the action of the solenoid and will tilt the lever 9 so that the circuit-closing contacts 10 and 11 engage their corresponding mercury cups. When this takes place it will be observed that the battery 7 is connected so as to form a local circuit including the auxiliary anode and the main 4. The rectifier being already in operation when this action takes place, an arc from the auxiliary anode to the cathode starts, due to the igniting action of the already existing arcs in the rectifier. This auxiliary arc will then continue indefinitely until the load on the rectifier increases beyond the range of instability in which case the solenoid 23 strengthens and overcomes the spring 25 and tilts the lever 9 so as to break contact with the mercury cups 14 to 17 and then cause the contacts on the opposite end of the lever to engage the mercury contacts 18 to 21. When this action takes place, the circuit of the auxiliary arc in the rectifier 1 is, of course, interrupted. The storage battery 7 is then connected by circuits, easily traced, extending directly across the mains 4 and 6. With this connection the battery is continuously charged from the main rectifier and at such a rate as may be determined by the combined effect of the resistances 8 and 22. If the load current again decreases to the danger point, the switch lever 9 tilts back as already described and the battery 8, by this operation, is first disconnected from the load circuit and is then connected in the local circuit for producing the auxiliary arc in the rectifier. It will, of course, be understood that this auxiliary arc in the rectifier serves the purpose of preventing the rectifier from going out when the load on the rectifier becomes unduly small, and it also serves to restart the rectifier in case, when for any reason, such as failure of power or the like, the arcs in the rectifier go out.

In Fig. 1, I have shown the storage battery arranged to be charged in multiple with the load. If desired, however, the storage battery may be charged in series with the load either directly or in shunt with multiple resistance. Such an arrangement I have indicated in Fig. 2. In this figure, however, I have omitted all representation of the supply circuits of the rectifier since the same will readily be understood by those skilled in the art. The cathode of the rectifier, however, is indicated at 27 and the auxiliary anode at 28. The lead 29 extending from the cathode serves to convey current to the load indicated conventionally at 30. The main 31 is the return conductor extending from the opposite side of the load. The storage battery is indicated at 32 and is arranged so that it may be connected automatically in shunt to resistance 33 in series with the main 29, or in local circuit so as to produce an auxiliary between the electrodes 27 and 28 of the rectifier.

The switch mechanism employed for effecting connections may, of course, be of any desired character. I have, however, indicated conventionally one form suitable for the purpose. In this mechanism a solenoid connected in series with the main 29, which extends to the load, operates upon a magnetic core 34 carrying short-circuiting contacts 35 and 36. A spring 37 urges upward the core 34 with its contacts, while the solenoid pulls downward on this member. When the apparatus is working normally the solenoid overcomes the action of the spring 37 and causes the contact 36 to bridge the contacts 38 and 39 so as to connect the battery 32 in shunt to the resistance 33 in which position the battery will be charged. When the current in the load circuit decreases sufficiently the solenoid weakens, and the core 34 with its contacts moves upward, breaks connection between the contacts 38 and 39, and completes the connection between the inside contacts 40 and 41. The battery 32, by this change of connections, is now connected in the local circuit including the electrodes 27 and 28, and immediately produces an auxiliary arc in the rectifier, which arc continues until the load current of the rectifier has increased beyond the predetermined minimum. Thereupon the battery is again shifted to the charging connection.

It will be evident from the foregoing that my invention may be embodied in a variety of forms, for which reason I do not wish to be limited to the exact details shown and described.

What I claim as new and desire to secure by Letters Patent of the United States, is,—

1. The combination of a rectifier, a load circuit supplied thereby, means for maintaining stability of operation of said rectifier and automatic means for operatively connecting said maintaining means when the average instantaneous current in the load circuit decreases abnormally and for disconnecting the same when normal conditions are restored.

2. The combination of an alternating current mercury vapor apparatus, a load circuit continuously connected thereto, a storage battery, means for charging the battery when the current in the load circuit exceeds a predetermined amount, and means for causing the battery to produce an auxiliary arc in said mercury vapor apparatus when the current in the load circuit decreases below said predetermined amount.

3. The combination of a rectifier having main electrodes and an auxiliary anode, a load circuit continuously connected to said rectifier, a storage battery, and means responsive to abnormal decrease of current in the load circuit for connecting the battery to said auxiliary anode so as to produce an auxiliary arc in the rectifier until normal conditions are restored.

4. The combination of a rectifier, a load circuit supplied thereby, and means for producing and sustaining an auxiliary arc in said rectifier while the current in the load circuit is less than a predetermined amount, said means acting automatically to interrupt the auxiliary arc when the load equals or exceeds the predetermined minimum amount.

5. The combination of a rectifier, a load circuit normally supplied thereby, a storage battery, and means operative when the load current becomes normal for throwing said battery in circuit to be charged and operative when the load current falls abnormally to connect the battery across the rectifier to keep said rectifier stable.

6. The combination of a rectifier, a load circuit continuously supplied thereby, a storage battery, and automatic means for connecting said battery across said rectifier at times of light load and for connecting it in circuit to be charged at times of heavier load.

In witness whereof, I have hereunto set my hand this 10th day of Oct., 1907.

ALEXANDER CHURCHWARD.

Witnesses:
 I. BONEPARTH,
 L. C. FOSS.